US012752368B2

(12) United States Patent
Yanase et al.

(10) Patent No.: US 12,752,368 B2
(45) Date of Patent: Oct. 6, 2026

(54) LASER WELDING MONITORING DEVICE AND LASER WELDING MONITORING METHOD

(71) Applicants: AMADA CO., LTD., Kanagawa (JP); AMADA WELD TECH CO., LTD., Kanagawa (JP)

(72) Inventors: Atsushi Yanase, Kanagawa (JP); Yusuke Nishizaki, Kanagawa (JP)

(73) Assignees: AMADA CO., LTD., Kanagawa (JP); AMADA WELD TECH CO., LTD., Kanagawa (JP)

(*) Notice: Subject to any disclaimer, the term of this patent is extended or adjusted under 35 U.S.C. 154(b) by 905 days.

(21) Appl. No.: 17/909,288

(22) PCT Filed: Feb. 25, 2021

(86) PCT No.: PCT/JP2021/007160
§ 371 (c)(1),
(2) Date: Sep. 2, 2022

(87) PCT Pub. No.: WO2021/182122
PCT Pub. Date: Sep. 16, 2021

(65) Prior Publication Data

US 2023/0080667 A1 Mar. 16, 2023

(30) Foreign Application Priority Data

Mar. 9, 2020 (JP) ................................ 2020-039761

(51) Int. Cl.
*B23K 26/03* (2006.01)
*B23K 26/082* (2014.01)
(Continued)

(52) U.S. Cl.
CPC ............ *B23K 26/03* (2013.01); *B23K 26/082* (2015.10); *B23K 26/21* (2015.10); *B23K 31/125* (2013.01); *B23K 26/032* (2013.01)

(58) Field of Classification Search
CPC .... B23K 31/125; B23K 26/24; B23K 26/032; B23K 26/22; B23K 26/03; B23K 26/21; B23K 26/082; B23K 26/00
See application file for complete search history.

(56) References Cited

U.S. PATENT DOCUMENTS 4,761,054 A * 8/1988 Ishimori .............. B23K 26/032 385/100
2001/0027964 A1* 10/2001 Isaji ..................... H05K 3/0035 219/121.62
(Continued)

FOREIGN PATENT DOCUMENTS

JP S60-127090 A1 7/1985
JP 2000-153379 6/2000
(Continued)

OTHER PUBLICATIONS

William J. Kessler and Mark G. Allen, "Near-IR diode laser monitoring of volatile organic compounds," CFN2 Conference on Lasers and Electro-Optics (CLEO:S&I) 1997. <https://opg.optica.org/abstract.cfm?uri=CLEO-1997-CFN2> (Year: 1997).*
(Continued)

*Primary Examiner* — Steven W Crabb
*Assistant Examiner* — Allison E Helferty
(74) *Attorney, Agent, or Firm* — Renner, Otto, Boisselle & Sklar, LLP

(57) ABSTRACT

When a material to be welded is irradiated with a laser beam emitted by a processing head, a beam receiving units receive a radiated beam including a reflected beam of the laser beam and a monitoring beam that is caused by thermal radiation and is a beam having a wavelength different from that of the
(Continued)

reflected beam. A spectrometer unit spectrally separates the reflected beam and the monitoring beam, and converts the monitoring beam into a first electric signal. A trigger unit converts the reflected beam into a second electric signal, and outputs a trigger signal when a level of the second electric signal is a predetermined threshold value or higher. When the trigger signal is input, a laser welding monitor starts, based on the first electric signal, a determination of whether or not laser welding of the material to be welded is normally performed.

6 Claims, 5 Drawing Sheets

(51) Int. Cl.
*B23K 26/21* (2014.01)
*B23K 31/12* (2006.01)

(56) References Cited

U.S. PATENT DOCUMENTS

2014/0251960 A1 9/2014 Borell
2015/0021303 A1* 1/2015 Funaki ............... B23K 26/0648 219/121.62
2015/0075700 A1* 3/2015 Kawagishi .......... B29C 66/9592 156/64
2015/0266132 A1* 9/2015 Kawakita ............... B23K 26/24 219/121.64
2017/0038249 A1* 2/2017 Fujita .................... G01J 1/0422
2017/0282300 A1* 10/2017 Mori .................... B23K 26/032

FOREIGN PATENT DOCUMENTS

JP 2002144068 A 5/2002
JP 2007-98442 A 4/2007
JP 2007326134 A * 12/2007
JP 2010-110796 A 5/2010
JP 2016-15310 A 1/2016
JP 2017-024046 A 2/2017
JP 2019-188409 A 10/2019

OTHER PUBLICATIONS

Extended European Search Report for corresponding EP Application No. 21768923.1 issued Sep. 6, 2023.
International Search Report for corresponding Application No. PCT/JP2021/007160, mailed Apr. 20, 2021.
Written Opinion for corresponding Application No. PCT/JP2021/007160, mailed Apr. 20, 2021.

* cited by examiner

LASER WELDING MONITORING DEVICE AND LASER WELDING MONITORING METHOD

TECHNICAL FIELD

The present disclosure relates to a laser welding monitoring device and a laser welding monitoring method for monitoring whether or not laser welding is normally performed.

BACKGROUND ART

As described in Patent Literatures 1 and 2, a laser welding monitoring device monitors whether or not laser welding is normally performed when the welding is performed on a material to be welded by a laser welding machine.

CITATION LIST

Patent Literature

Patent Literature 1: Japanese Patent Application Laid-Open Publication No. 2010-110796
Patent Literature 2: Japanese Patent Application Laid-Open Publication No. 2017-24046

SUMMARY

It is desirable that the laser welding monitoring device starts monitoring at a timing at which the laser welding machine starts welding of the material to be welded. For example, the laser welding monitoring device may start the monitoring in accordance with a timing at which a laser oscillator starts emission of a laser beam. However, some laser oscillators do not output a signal indicating the start of the emission of the laser beam at the timing of starting the emission of the laser beam. Therefore, a configuration is required in which the laser welding monitoring device starts the monitoring by accurately detecting the timing at which the laser welding machine starts the welding of the material to be welded.

An object of one or more embodiments is to provide a laser welding monitoring device and a laser welding monitoring method capable of starting monitoring of laser welding by accurately detecting a timing at which a laser welding machine starts welding of a material to be welded.

According to a first aspect of the one or more embodiments, a laser welding monitoring device is provided that includes a beam receiving unit configured to receive, when a material to be welded is irradiated with a laser beam emitted by a processing head provided to a laser welding machine, a radiated beam generated at an irradiation position of the laser beam and including a reflected beam of the laser beam and a monitoring beam, the monitoring beam being caused by thermal radiation and having a wavelength different from a wavelength of the reflected beam, a spectrometer unit configured to spectrally separate the reflected beam and the monitoring beam included in the radiated beam and convert the spectrally separated monitoring beam into a first electric signal, a trigger unit configured to convert the reflected beam into a second electric signal and output a trigger signal when a level of the second electric signal is a predetermined threshold value or higher, and a laser welding monitor configured to start a determination of whether or not laser welding of the material to be welded is normally performed based on the first electric signal when the trigger signal is input.

According to a second aspect of the one or more embodiments, a laser welding monitoring method is provided that includes receiving, when a material to be welded is irradiated with a laser beam emitted by a processing head provided to a laser welding machine, by a beam receiving unit, a radiated beam generated at an irradiation position of the laser beam and including a reflected beam of the laser beam and a monitoring beam, the monitoring beam being caused by thermal radiation and having a wavelength different from a wavelength of the reflected beam, spectrally separating the reflected beam and the monitoring beam included in the radiated beam, converting the spectrally separated monitoring beam into a first electric signal, converting the reflected beam into a second electric signal, generating a trigger signal when a level of the second electric signal is a predetermined threshold value or higher, and starting a determination of whether or not laser welding of the material to be welded is normally performed based on the first electric signal by using an input of the trigger signal as a trigger.

According to the laser welding monitoring device and the laser welding monitoring method of the one or more embodiments, it is possible to start the monitoring of the laser welding by accurately detecting the timing at which the laser welding machine starts the welding of the material to be welded.

DESCRIPTION OF EMBODIMENTS

Figure 1:
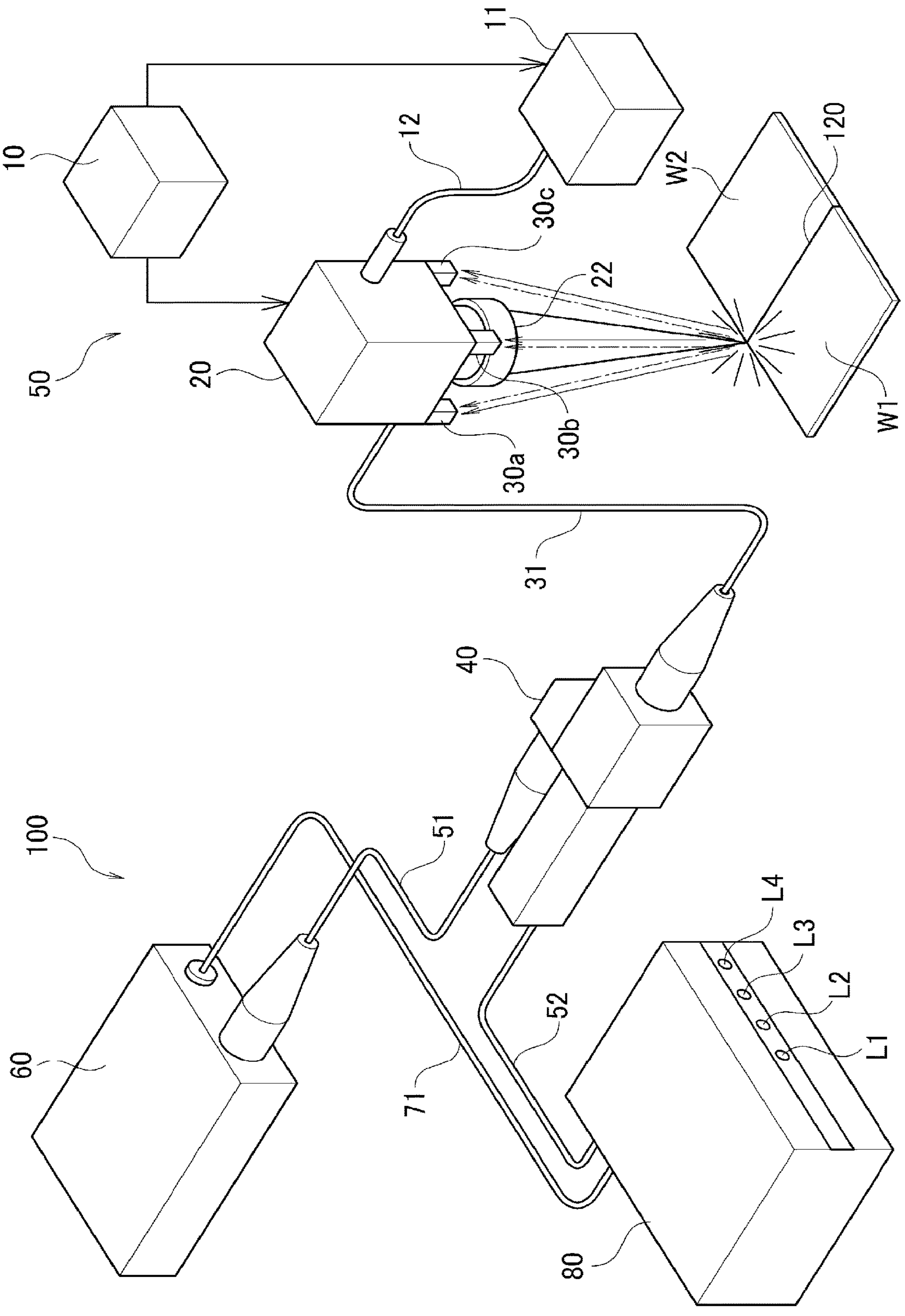
FIG. 1 is a perspective view showing a laser welding monitoring device according to one or more embodiments.

Hereinafter, a laser welding monitoring device and the laser welding monitoring method of one or more embodiments will be described with reference to the attached drawings. In FIG. 1, a laser welding machine 50 is provided with an NC device 10, a laser oscillator 11, and a processing head 20. The laser oscillator 11 is, for example, a fiber laser oscillator that emits a laser beam having a wavelength of 1060 nm to 1080 nm. The laser beam emitted by the laser oscillator 11 is transmitted to the processing head 20 by a process fiber 12.

Figure 2:
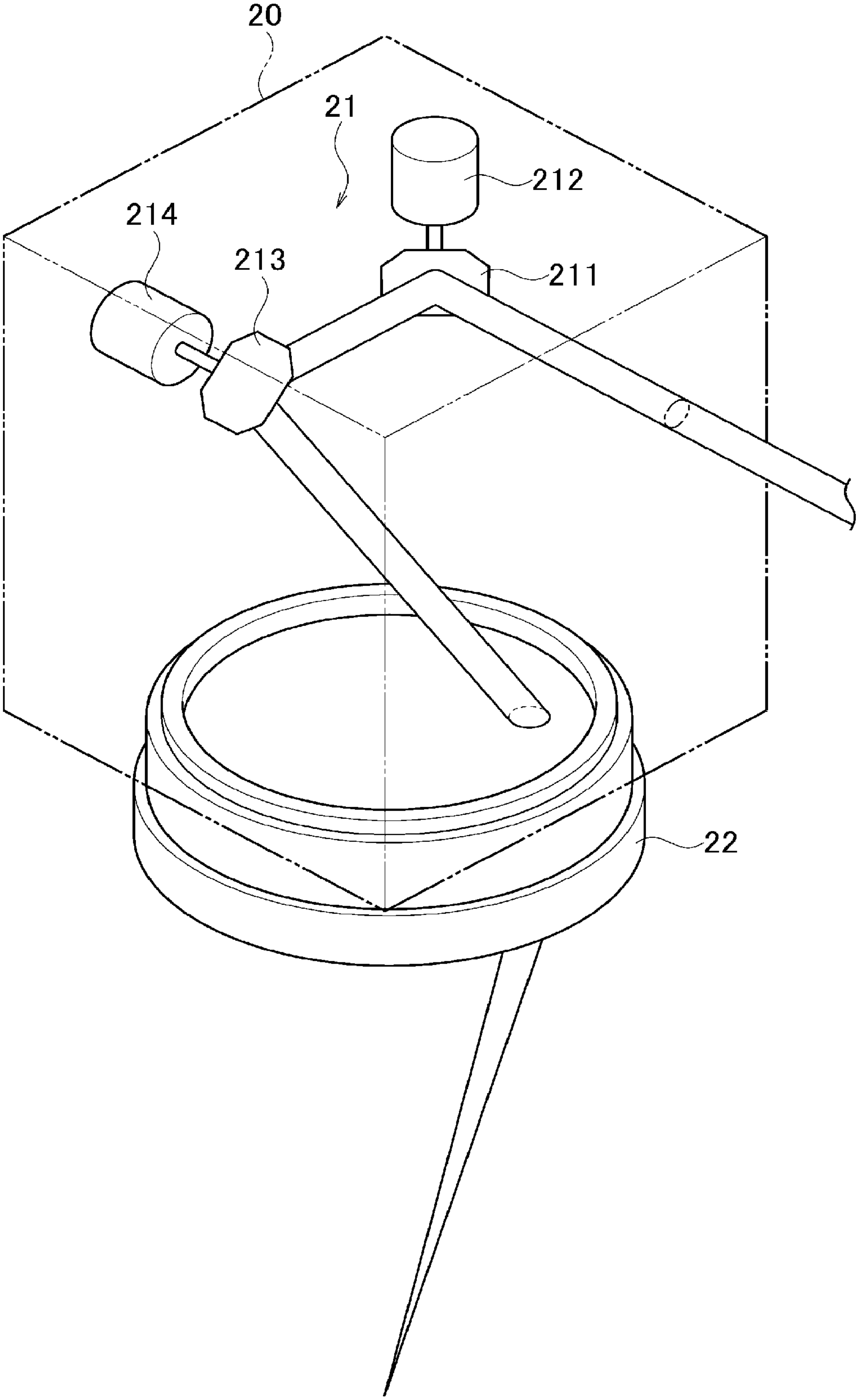
FIG. 2 is a perspective view showing a configuration example of a processing head provided to a laser welding machine.

As shown in FIG. 2, the processing head 20 is provided with a galvano scanner 21 and an fθ lens 22. The galvano scanner 21 is provided with galvano mirrors 211 and 213, and drive units 212 and 214 that rotate the galvano mirrors 211 and 213 so as to have a predetermined angle, respectively. The laser beam emitted from the process fiber 12 and made incident on the galvano mirror 211 is reflected by the galvano mirror 211 and made incident on the galvano mirror 213, and then is reflected by the galvano mirror 213 and made incident on the fθ lens 22. The fθ lens 22 focuses the incident laser beam to irradiate a material to be welded with the laser beam.

By changing the respective angles of the galvano mirrors 211 and 213, the laser beam with which the material to be welded is irradiated can be displaced. By continuously moving the galvano mirrors 211 and 213, the laser beam can be vibrated or rotated. The fθ lens 22 can also focus the laser beam on one plane of the material to be welded when the galvano scanner 21 is operated.

Returning to FIG. 1, the NC device 10 controls the laser oscillator 11 and the drive units 212 and 214 of the galvano scanner 21. The NC device 10 also controls the movement of the processing head 20. The laser beam emitted from the processing head 20 is applied on an abutting surface 120 of sheet metals W1 and W2, which are examples of the materials to be welded, so that the sheet metal W1 and the sheet metal W2 are welded.

It is not essential that the processing head 20 is provided with the galvano scanner 21, but it is preferable that the processing head 20 is provided with the galvano scanner 21. If the processing head 20 is not provided with the galvano scanner 21, the processing head 20 may be provided with a bend mirror that reflects the laser beam toward the sheet metal W1 and the sheet metal W2 and a normal focusing lens instead of the fθ lens 22.

In FIG. 1, a laser welding monitoring device 100 is provided with four beam receiving units that are beam receiving units 30*a* to 30*c*, and an unillustrated beam receiving unit located at a position facing the beam receiving unit 30*b* with the processing head 20 interposed therebetween. The beam receiving unit at an arbitrary position is referred to as a beam receiving unit 30. In a configuration in which the processing head 20 is provided with the galvano scanner 21, the number of the beam receiving units 30 is preferably two or more, and a plurality of beam receiving units 30 are preferably arranged on the periphery of the fθ lens 22 at equal intervals. When the processing head 20 is not provided with the galvano scanner 21, the number of the beam receiving unit 30 may be one. Even in the configuration in which the processing head 20 is not provided with the galvano scanner 21, the number of the beam receiving units 30 may be two or more.

Further, the laser welding monitoring device 100 is provided with a spectrometer unit 40, a trigger unit 60, and a laser welding monitor 80.

When the abutting surface 120 of the sheet metals W1 and W2 is irradiated with the laser beam, a radiated beam including a reflected beam of the laser beam and a near-infrared beam caused by thermal radiation is generated from the irradiation position of the laser beam. The four beam receiving units 30 receive the radiated beam, and the radiated beam received by the four beam receiving units 30 is made incident on the spectrometer unit 40 by a bundle fiber 31. In FIG. 1, the solid arrow line travelling from the abutting surface 120 to the beam receiving unit 30 indicates the reflected beam of the laser beam, and the alternate long and short dash arrow line indicates the near-infrared beam. The wavelength of the near-infrared beam is 1300 nm to 2500 nm. The near-infrared beam is a preferable example of a monitoring beam that is caused by thermal radiation and has a wavelength different from a wavelength of the reflected beam of the laser beam.

The beam receiving unit 30 is configured to include a protective glass on an incident surface of the radiated beam so that the radiated beam is made incident on the end surface of a core of an optical fiber. The beam receiving unit 30 may be configured to receive the radiated beam including the reflected beam of the laser beam and the near-infrared beam caused by thermal radiation, and the configuration thereof is not limited.

Figure 3:
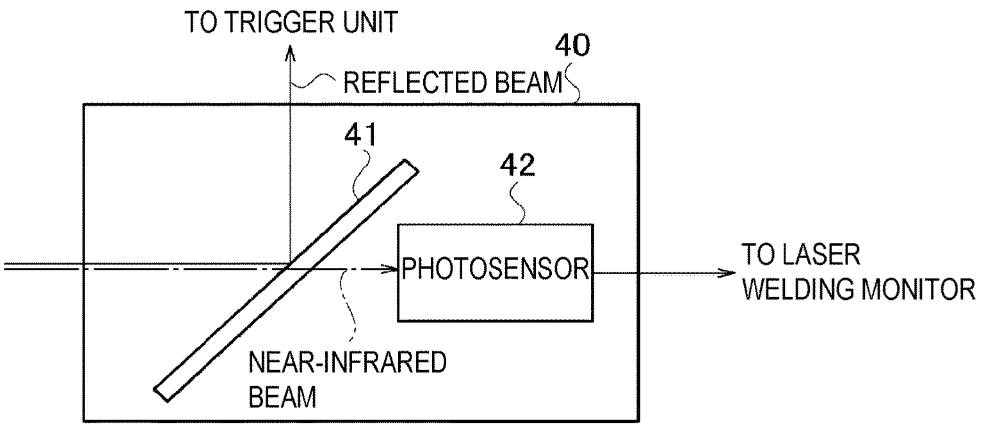
FIG. 3 is a diagram showing a configuration example of a spectrometer unit included in the laser welding monitoring device of the one or more embodiments.

As shown in FIG. 3, the spectrometer unit 40 is provided with a dichroic mirror 41 that transmits a beam having a wavelength of 1300 nm or more and reflects a beam having a wavelength of less than 1300 nm, and a photosensor 42. The reflected beam of the laser beam indicated by the solid arrow line is reflected by the dichroic mirror 41, and the near-infrared beam indicated by the alternate long and short dash arrow line passes through the dichroic mirror 41 and is made incident on the photosensor 42. The photosensor 42 converts the incident near-infrared beam into an electric signal (a near-infrared monitor signal) and outputs the signal. The near-infrared monitor signal is an example of a first electric signal. The first electric signal is preferably a digital signal.

In FIG. 1, the reflected beam of the laser beam emitted from the spectrometer unit 40 is transmitted via the reflected beam transmission fiber 51 and made incident on the trigger unit 60. The near-infrared monitor signal output from the spectrometer unit 40 is transmitted via a monitor signal transmission cable 52 and input to the laser welding monitor 80.

Figure 4:
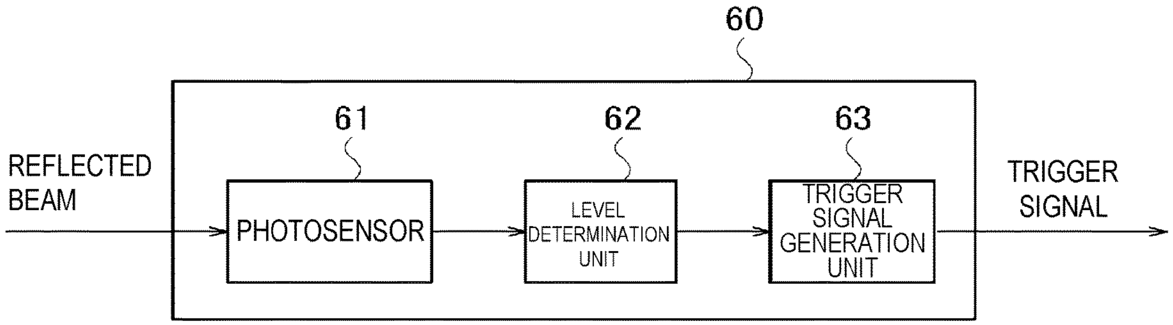
FIG. 4 is a block diagram showing a configuration example of a trigger unit included in the laser welding monitoring device of the one or more embodiments.

As shown in FIG. 4, the trigger unit 60 is provided with a photosensor 61, a level determination unit 62, and a trigger signal generation unit 63. The photosensor 61 converts the reflected beam of the incident laser beam into an electric signal (a second electric signal). The level determination unit 62 determines whether or not the level of the input electric signal is a predetermined threshold value or higher. The trigger signal generation unit 63 generates and outputs a trigger signal if the electric signal input to the level determination unit 62 is a predetermined threshold value or higher. The level determination unit 62 and the trigger signal generation unit 63 can be configured by a circuit. The level determination unit 62 and the trigger signal generation unit 63 may be configured by a processor. The second electric signal may be an analog signal or a digital signal. The trigger signal is preferably a digital signal.

In FIG. 1, the trigger signal is transmitted via a trigger signal transmission cable 71 and is input to the laser welding monitor 80. When the trigger signal is input, the laser welding monitor 80 starts monitoring of whether or not laser welding is normally performed based on the near-infrared monitor signal by using the input of the trigger signal as a trigger. As an example, the laser welding monitor 80 integrates the input near-infrared monitor signals for a predetermined period of time, and if the integrated value is between the upper limit value and the lower limit value that are preset, the laser welding is determined to be normally performed. If the integrated value is not between the upper limit value and the lower limit value, the laser welding monitor 80 determines that the laser welding is not performed normally and that an abnormality has occurred. How the laser welding monitor 80 determines whether or not the laser welding is normally performed is not limited.

The laser welding monitor 80 is provided with light emitting diodes L1 to L4 on the front surface of a housing thereof. When the laser welding monitor 80 determines that the laser welding is normally performed, the light emitting diode L4 of green color is turned on, for example, and when the laser welding monitor 80 determines that an abnormality has occurred in the laser welding, the light emitting diode L3 of red color is turned on, for example. For example, the light emitting diode L1 of green color is turned on when the power of the laser welding monitor 80 is applied. For example, the light emitting diode L2 of green color is turned on when a trigger signal is input.

Figure 5:
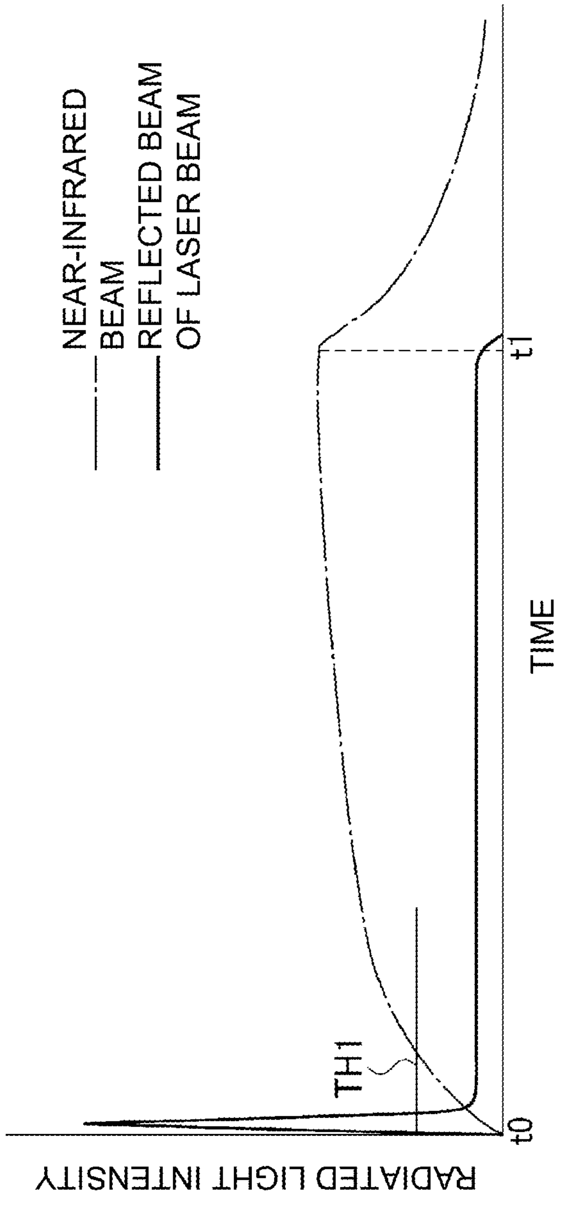
FIG. 5 is a characteristic diagram showing changes in radiated light intensity of the reflected beam and a near-infrared beam of the laser beam generated at the irradiation position of the laser beam when the laser welding machine starts and ends the irradiation of the laser beam.

The timing at which the laser welding monitor 80 starts the monitoring of the laser welding will be described with reference to the characteristic diagram shown in FIG. 5. In FIG. 5, it is assumed that the processing head 20 starts irradiation of the laser beam to the abutting surface 120 between the sheet metals W1 and W2 at time t0 and ends the irradiation of the laser beam at time t1. The radiated light intensity of the near-infrared beam indicated by the alternate long and short dash line increases gradually after the start of the irradiation of the laser beam. On the other hand, the radiated light intensity of the reflected beam of the laser beam shown by the solid line increases sharply immediately after the start of the irradiation of the laser beam, decreases sharply, and then becomes a substantially constant value.

Assuming that the threshold value set to the level determination unit 62 of the trigger unit 60 is the level of the electric signal corresponding to the radiated light intensity of a threshold value TH1 shown in FIG. 5, the trigger unit 60 outputs the trigger signal immediately after the time to. Therefore, the laser welding monitoring device 100 can accurately detects the timing at which the laser welding machine 50 starts welding of the sheet metals W1 and W2, and start monitoring of the laser welding with almost no time delay from the timing at which the welding is started.

In FIG. 5, if the trigger unit 60 is configured to output the trigger signal at the timing at which the radiated light intensity of the near-infrared beam increases to a predetermined intensity, the radiated light intensity of the near-infrared beam increases only gradually. Therefore, when the processing is repeated under the same laser welding conditions, the timing at which the threshold value TH1 is exceeded varies. Therefore, it is not possible to output the trigger signal immediately after the time t0, and the timing of outputting the trigger signal may be delayed or vary. In comparison to this, since the reflected beam increases sharply immediately after the start of the processing, it is possible to suppress variations in the timing at which the threshold value TH1 is exceeded even when the processing is repeated, which enables the monitoring of the laser welding to be started with high repeatability.

Figure 6:
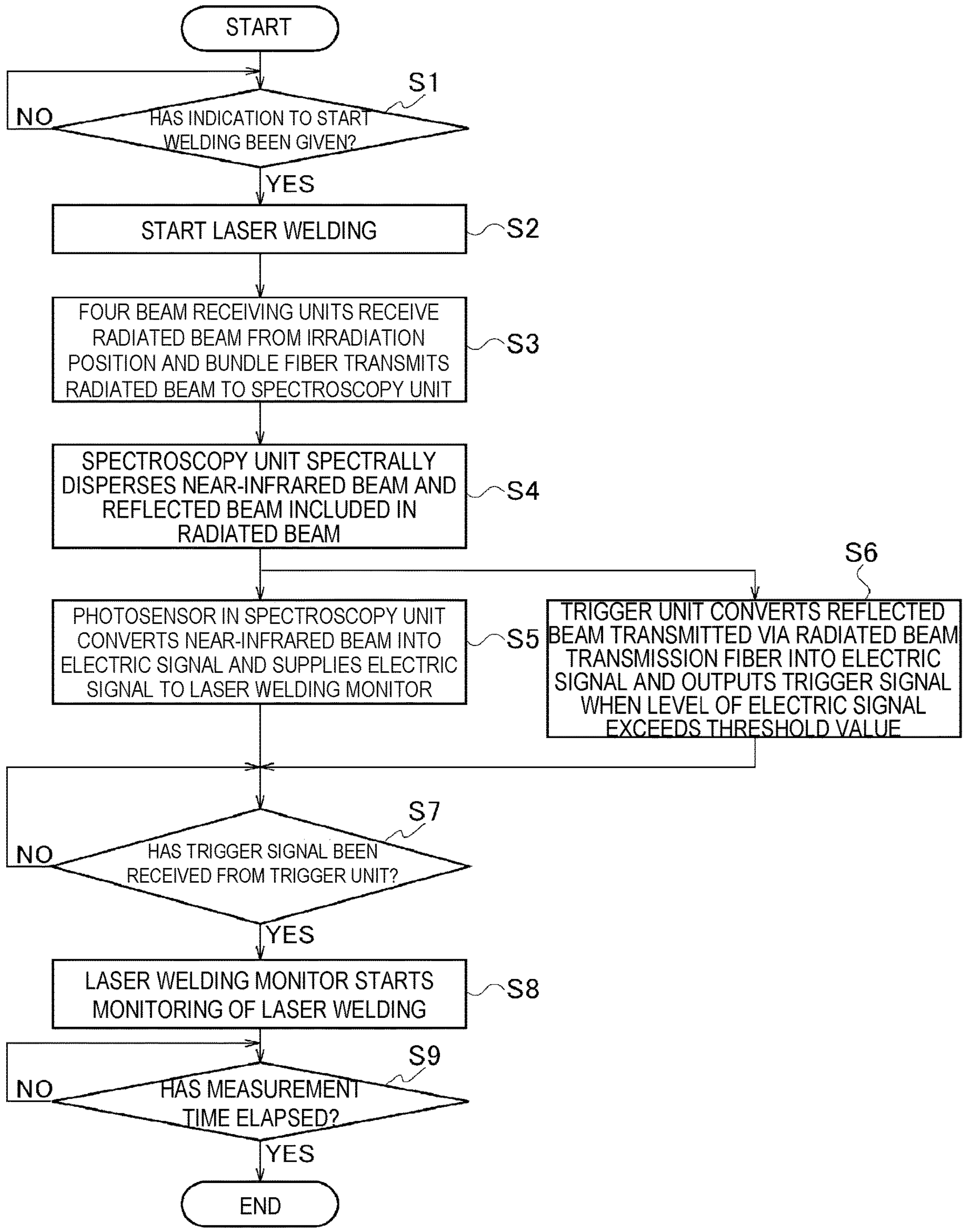
FIG. 6 is a flowchart showing a laser welding monitoring method according to the one or more embodiments.

The laser welding monitoring method executed by the laser welding monitoring device 100 will be described with reference to the flowchart shown in FIG. 6. FIG. 6 also includes processing executed by the laser welding machine 50. In step S1 of FIG. 6, the NC device 10 determines whether or not an instruction to start welding has been given. If the instruction to start welding is not given (NO), the NC device 10 repeats the process of step S1. If the instruction to start welding is given (YES), the NC device 10 starts the laser welding in step S2 by starting laser oscillation in the laser oscillator 11.

In step S3, the four beam receiving units 30 receive the radiated beams from the irradiation position of the laser beam, and the bundle fiber 31 transmits the received radiated beams to the spectrometer unit 40. In step S4, the spectrometer unit 40 spectrally separates the reflected beam of the laser beam and the near-infrared beam that are included in the radiated beam. In step S5, the photosensor 42 of the spectrometer unit 40 converts the near-infrared beam into the electric signal and supplies the electric signal to the laser welding monitor 80.

In parallel to step S5, in step S6, the trigger unit 60 converts the reflected beam transmitted via the reflected beam transmission fiber 51 into the electric signal, and outputs the trigger signal when the level of the electric signal exceeds the threshold value.

In step S7, the laser welding monitor 80 determines whether or not the trigger signal has been received from the trigger unit 60. If the trigger signal is not received (NO), the laser welding monitor 80 repeats the process of step S7. If the trigger signal is received (YES), the laser welding monitor 80 starts monitoring of the laser welding in step S8.

In step S9, the laser welding monitor 80 determines whether or not a preset measurement time has elapsed. If the measurement time does not elapse (NO), the laser welding monitor 80 repeats the process of step S9. The monitoring of the laser welding is continued while the process of step S9 is repeated. If the measurement time has elapsed (YES), the laser welding monitor 80 ends the monitoring of the laser welding.

Even when the laser welding monitor 80 has ended the monitoring of the laser welding, the welding by the laser welding machine 50 may not be ended. The welding by the laser welding machine 50 may be ended before the laser welding monitor 80 ends the monitoring of the laser welding. Note that even if the trigger signal is input to the laser welding monitor 80 again within the measurement time, the trigger signal within the measurement time is ignored.

The timing at which the laser welding monitor 80 ends the monitoring of the laser welding is not limited to the point of time at which the measurement time has elapsed. The laser welding monitor 80 may end the monitoring of the laser welding at the point of time at which the welding by the laser welding machine 50 is completed.

As described above, according to the laser welding monitoring device and the laser welding monitoring method of the one or more embodiments, it is possible to start the monitoring of the laser welding by accurately detecting the timing at which the laser welding machine 50 starts the welding of the material to be welded.

The present invention is not limited to the one or more embodiments described above, and various modifications can be made without departing from the summary of the present invention. In the one or more embodiments, the laser welding monitor 80 uses the near-infrared monitor signal obtained by converting the near-infrared beam into the electric signal so as to determine whether or not the laser welding is normally performed. However, a plasma beam or a visible beam may be converted into an electric signal. A beam having a wavelength different from the wavelength of the laser beam emitted by the laser oscillator 11 may be converted into an electric signal.

As the laser oscillator 11, a direct diode laser oscillator (a DDL oscillator) may be used instead of the fiber laser oscillator. The DDL oscillator emits a laser beam having a wavelength of 910 nm to 950 nm. The wavelength of the laser beam emitted from the laser oscillator 11 is preferably in the 1 μm band having a wavelength of 900 nm to 1100 nm.

Although the laser welding monitoring device 100 shown in FIG. 1 is provided with a separate housing for each of the spectrometer unit 40, the trigger unit 60, and the laser welding monitor 80, the trigger unit 60 may be provided in the housing of the laser welding monitor 80. The spectrometer unit 40 and the trigger unit 60 may be provided in one housing. The spectrometer unit 40 and the trigger unit 60 may be provided in the housing of the laser welding monitor 80. The position at which the spectrometer unit 40 or the trigger unit 60 is provided is not limited.

The method described above, in which the laser welding monitor 80 starts the monitoring of the laser welding by the input of the trigger signal, may be applied when monitoring of arc welding or laser cutting is started. Particularly, in laser cutting of a sheet metal, the method of the one or more embodiments can be used substantially as it is, and can be used as a laser processing monitoring device and a laser processing monitoring method for laser welding or laser cutting.

The present application claims priority based on Japanese Patent Application No. 2020-039761 filed with the Japan Patent Office on Mar. 9, 2020, and all the disclosures thereof are incorporated herein by reference.

The invention claimed is:

1. A laser welding monitoring device, comprising:

a beam receiving unit configured to receive, when a material to be welded is irradiated with a laser beam emitted by a processing head provided to a laser welding machine, a radiated beam generated at an irradiation position of the laser beam and including a reflected beam of the laser beam and a monitoring beam, the monitoring beam being caused by thermal radiation and having a wavelength different from a wavelength of the reflected beam;

a spectrometer unit configured to spectrally separate the reflected beam and the monitoring beam included in the radiated beam and convert the spectrally separated monitoring beam into a first electric signal;

a trigger unit configured to convert the reflected beam into a second electric signal, to determine whether or not a level of the second electric signal is a predetermined threshold value or higher, and to immediately output a trigger signal indicating a timing at which the laser welding machine starts welding of the material to be welded when the level of the second electric signal is the predetermined threshold value or higher; and a laser welding monitor configured to start a determination of whether or not laser welding of the material to be welded is normally performed based on the first electric signal when the trigger signal is input.

2. The laser welding monitoring device according to claim 1, wherein a wavelength of the laser beam is 900 nm to 1100 nm, and the monitoring beam is a near-infrared beam and has a wavelength of 1300 nm to 2500 nm.

3. The laser welding monitoring device according to claim 1, wherein the processing head is provided with a galvano scanner configured to displace, vibrate, or rotate the laser beam emitted by the processing head, and an fθ lens configured to focus the laser beam to irradiate the material to be welded with the laser beam, and a plurality of beam receiving units arranged on a periphery of the fθ lens are provided.

4. A laser welding monitoring method, comprising:

receiving, when a material to be welded is irradiated with a laser beam emitted by a processing head provided to a laser welding machine, by a beam receiving unit, a radiated beam generated at an irradiation position of the laser beam and including a reflected beam of the laser beam and a monitoring beam, the monitoring beam being caused by thermal radiation and having a wavelength different from a wavelength of the reflected beam;

spectrally separating the reflected beam and the monitoring beam included in the radiated beam;

converting the spectrally separated monitoring beam into a first electric signal;

converting the reflected beam into a second electric signal;

determining whether or not a level of the second electric signal is a predetermined threshold value or higher to immediately generate a trigger signal indicating a timing at which the laser welding machine starts welding of the material to be welded when the level of the second electric signal is the predetermined threshold value or higher; and starting a determination of whether or not laser welding of the material to be welded is normally performed based on the first electric signal by using an input of the trigger signal as a trigger.

5. The laser welding monitoring method according to claim 4, wherein a wavelength of the laser beam is 900 nm to 1100 nm, and the monitoring beam is a near-infrared beam and has a wavelength of 1300 nm to 2500 nm.

6. The laser welding monitoring method according to claim 4, wherein:

the processing head is provided with a galvano scanner configured to displace, vibrate, or rotate the laser beam emitted by the processing head, and an fθ lens configured to focus the laser beam to irradiate the material to be welded with the laser beam; and the radiated beam is received by a plurality of beam receiving units arranged on a periphery of the fθ lens.

* * * * *